Nov. 16, 1971   A. B. ALBRECHT   3,619,913
DEMONSTRATOR FINGER RING
Filed March 9, 1970
*Fig. 1.*
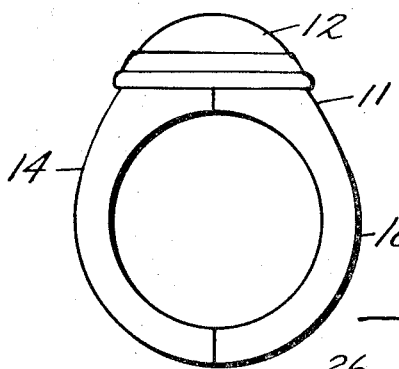
*Fig. 2.*
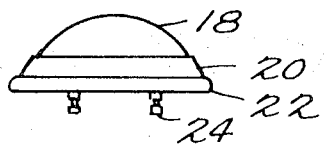
*Fig. 3.*
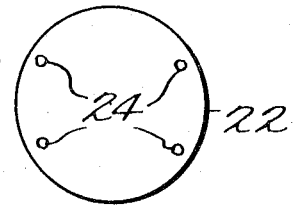
*Fig. 4.*
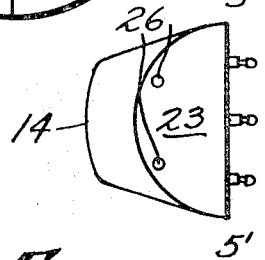
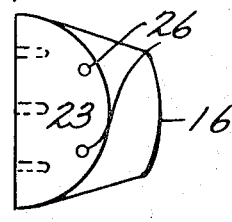
*Fig. 5.*   *Fig. 6.*   *Fig. 7.*
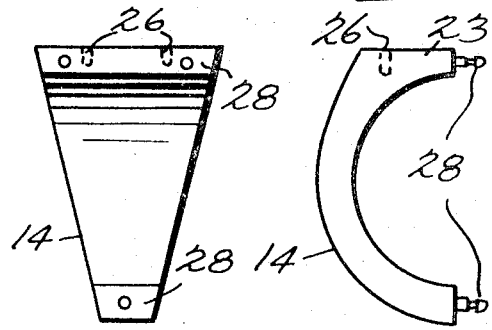
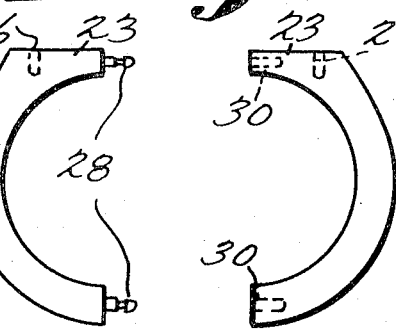
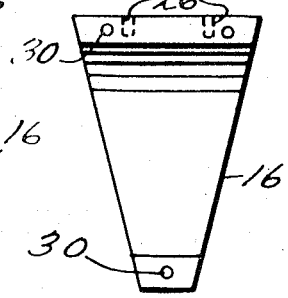
*Fig. 8.*   *Fig. 10.*
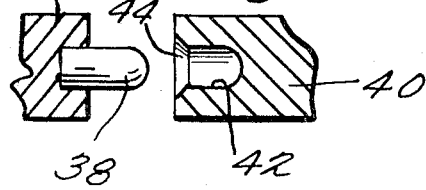
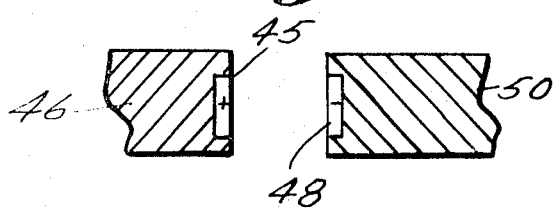
*Fig. 9.*
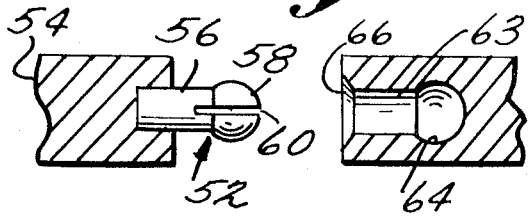
INVENTOR
ARTHUR B. ALBRECHT
BY *Cushman, Darby & Cushman*
ATTORNEYS

United States Patent Office 3,619,913
Patented Nov. 16, 1971

3,619,913
DEMONSTRATOR FINGER RING
Arthur B. Albrecht, Box 608, Yoakum, Tex. 77995
Filed Mar. 9, 1970, Ser. No. 17,845
Int. Cl. G09b 25/00
U.S. Cl. 35—53    9 Claims

ABSTRACT OF THE DISCLOSURE

A demonstrator ring having a plurality of changeable parts comprising a male arcuate part, a female arcuate part and a top setting part. The top setting part has a plurality of joining segments projecting from its base; the male arcuate part has a plurality of joining segments projecting from it and a plurality of channel-shaped recesses therein; and the female arcuate part as a plurality of channel-shaped recesses therein. The parts are positioned so that the joining segments engage the channel-shaped recesses to form an interchangeable finger ring having a substantially circular inner surface.

---

This invention relates generally to finger rings and more particularly to school class rings and fraternal finger rings. Specifically the invention pertains to a finger ring demonstrator which is constructed so that the ring may be arranged, assembled or connected together to form a complete ring so that an individual or group can visually select their particular choice in rings. Prior to this invention, jewelers or ring salesmen were unable to show the customer exactly how a ring would look because the customer's choice of setting, degree, mascot, achievement, or educational insignia was not available on the particular rings in stock. With the present invention the customer has an exact idea of what the ring will ultimately look like when it is completed, with the additional psychological benefit that a greater prestige is given the ring, since the individual or group has presumably designed the ring.

There are additional benefits which are incurred in the use of the present invention. The ring inventory cost is reduced to the manufacturer, jeweler and salesman and separate mock up parts of the ring can be made from rings constructed of precious alloy metals or of non-precious metals having silver, gold, or platinum plating. The individual manufacturing of the head or top setting part and arcuate parts provide the customer with wide selections of ring combinations.

Under the present system of selling finger rings, if the finger ring does not satisfy the customer, the ring manufacturer has to make new dies or molds. This results in a time delay ranging from four to nine weeks besides the fact that the jeweler must absorb the cost of new dies and molds. If the particular individual or group does not like the end result or desires a modification, then the jeweler is stuck with old dies or molds. The present demonstrator finger ring provides a ring which can be constructed for immediate approval and sale because the exact appearance of the ring which will be manufactured is shown to the individual or group at the time of sale.

Other advantages of the invention will appear more clearly from the following specification in connection with the accompanying drawings in which:

FIG. 1 is a side elevational view of the demonstrator finger ring;

FIG. 2 is a side elevational view of the ring head or setting;

FIG. 3 is a plane view of the base of the ring head or setting shown in FIG. 2;

FIG. 4 is a plane view of the demonstrator finger ring body with the male and female parts broken away;

FIG. 5 is a cross-sectional view of that male half of the ring shown in FIG. 4 taken along line 5′—5′;

FIG. 6 is an exploded side view of the male and female arcuate ring part of the demonstrator ring shown in FIG. 4;

FIG. 7 is a cross sectional view of the female half of the ring shown in FIG. 4 taken along line 7′—7′;

FIG. 8 is an enlarged cross-sectional view of a portion of the demonstrator ring showing one form of joining segment and channel shaped recess;

FIG. 9 is an enlarged cross-sectional view of a portion of the demonstrator ring showing another form of joining segment and channel shaped recess; and FIG. 10 is an enlarged cross-sectional view of a portion of the demonstrator ring showing yet another form of attaching portions of the ring together.

As shown in FIG. 1, the finger ring 11 of the invention generally comprises three releasable parts. The aforementioned parts are a head or top setting 12, a male arcuate part 14 and a female arcuate part 16. While finger rings are normally made from precious metals such as gold, silver, or platinum, the present ring can be made from a base material and plated with precious metals. The head or top setting 12 can vary according to an individual or group's desire, as for example but not to be considered as limiting a buff stone, faceted stone, encrusted stone, floating relief or metal construction. While the usual head or top setting shape is substantially circular it is understood that an oval, round, rectangular or polyangular head shape may be used. The various parts of the finger ring 11 may be releasably attached to one another by a snap fastening arrangement, as shown in FIGS. 2–6 with variations thereof as shown in FIGS. 8 and 9; or, by an arrangement of magnets, as shown in FIG. 10.

The various joining elements of the ring parts are for the purpose of holding the demonstrator ring together for arrangement of the parts and display. The joining elements or segments of the head or top setting part and the arcuate side parts of the ring body can be releasably attached to one another as will be later described.

A preferred embodiment of the invention is shown by FIGS. 2–7. These figures show the structure of the top setting 12, male arcuate part 14 and female arcuate part 16. The male and female arcuate parts can have any desired molding, engraving or ornamentation. As shown by FIG. 2 the top setting is comprised of a base 22, upon which a setting or stone 18 is mounted or secured. A band 20 preferably surrounds the setting or stone 18 and is secured to the base 22. The band 20 preferably has encrusted or engraved thereupon the name or visual description of particular organization or academic institution which is desired. The setting or stone 18 can be secured to the base 22 by adhesives or other suitable means or can be kept in place by the action of band 20. Projecting from the surface of the base 22 are a plurality of joining segments or pins 24. It is apparent of course that the setting 12 can be of solid construction and of any desired shape or material. As shown by FIGS. 3, the plurality of joining segments or pins 24 extend from the base 22 so that they can join or enter channel-shaped recesses 26 which are sunk into the outer surface of male arcuate part 14 and female arcuate part 16. As shown by FIGS. 4 and 6 the top or upper outer surfaces 23 of each of the arcuate ring parts is preferably flat or planar so that the exposed planar surface of the base 22 can snugly fit when the parts are joined together. The male arcuate part of the finger ring has a plurality of joining segments or pins 28 which project from the upper portion and lower portion of the male arcuate ring part. Located in the outer surface of the flat or planar section of the male and female arcuate parts are a plurality of channel-shaped recesses 26 which are adapted to receive joining segments or pins 24 of the head or top setting 12. The female arcuate ring part 16 has a plurality of channel-shaped recesses 26, and 30 which are located respectively in the upper and lower portion of the ring part and are adapted to frictionally engage and hold joining segments or pins 28 of the arcuate male ring part and joining segments or pins 24 of the top setting.

FIG. 8 discloses a similar joining pin and channel or recess arrangement wherein pin 38 which is mounted in ring segment or part 36 is inserted and frictionally engages a channel-shaped recess 42 having a recess guide 44 in ring segment or part 40.

Another embodiment of the invention is disclosed in FIG. 9 and utilizes a snap fastening pin 52 which is comprised of a pin shaft 56 having a pin head 58 mounted to a ring segment 54. As can readily be seen the pin head 58 has a greater diameter than pin shaft 56. The pin head 58 preferably has a compression slot 60 cut or formed in it which allows the head 58 to be compressed when it enters the recess guide 66 and shaft channel 63 expanding or returning to its original shape when it enters the necked recess 64. The integral snap fastening pin can be constructed of any particular material as long as the material will enable the pin head 58 to compress so that the pin will slide through channel shaft 63 and snap into place in the necked recess 64. It should be noted that any suitable resilient material can be used in the construction of the pin head such as a polyethylene or other polymers which have the benefit of having a low frictional resilience against the sides of the recess for ease in assembly and disassembly of the segments.

As shown by FIG. 10 yet another embodiment of the invention is disclosed wherein a positive magnetic element 45 is mounted in a position of a ring segment or part 46 which will contact the negative magnetic element 48 of ring segment or part 50 so that the abutting ring parts will have opposite magnetic poles facing outwardly which will magnetically attract one another.

If desired, the demonstrator finger ring can be construed from existing rings by sawing or cutting the head or top setting away from the solid finger ring. The remaining substantially circular ring body is then cut so that the ring body is divided into a plurality of parts. All parts and the top setting are then drilled so that they have a plurality of apertures or recesses. A plurality of pins or joining segments are inserted and secured in the top setting and at least one of the ring body parts. The top setting and the body parts are then positioned so that the pins or joining segments engage the corresponding aperture of the cooperating parts to form an interchangeable finger ring.

It is apparent from the previous discussion that a great number of ring segments can be made so that any number of sides and tops can be interchanged thus giving the individual or group a choice of ring settings and side parts nomenclature and design.

Although the present invention has been described and illustrated in connection with various embodiments, it is to be understood that, modifications and variations may be restored to without departing from the spirit of the invention, as those skilled in this art will readily understand. Such modifications and variations are considered to be within the purview and scope of the present invention as defined by the appended claims.

What is claimed is:
1. A demonstration finger ring having changeable parts comprising:
   a female arcuate part, having a plurality of channel-shaped recesses therein;
   a male arcuate part having a plurality of joining segments projecting therefrom, and a plurality of channel-shaped recesses therein;
   said joining segments of said male arcuate part engaging said channel-shaped recesses of said female arcuate part to form an interchangeable finger ring body having a substantially circular inner surface; and
   a setting part, said setting part having a plurality of joining segments projecting therefrom, said setting part joining segments being positioned to engage said channel-shaped recesses of said male and female arcuate parts to form a finger ring.
2. A demonstration finger ring having changeable parts as claimed in claim 1 wherein said joining segments are pins.
3. A demonstration ring having changeable parts as claimed in claim 2 wherein said pins frictionally engage said channel-shaped recesses.
4. A demonstration finger ring having changeable parts as claimed in claim 1 wherein;
   said joining segments are shafts having an integral head of greater diameter than each of said shafts; and
   said channel-shaped recesses are necked.
5. A demonstration finger ring having changeable parts as claimed in claim 4 wherein each of said integral heads is slotted.
6. A demonstration finger ring having changeable parts as claimed in claim 1 wherein each of said channel-shaped recess has a recess guide.
7. A demonstration finger ring having changeable parts as claimed in claim 1 wherein said joining segments comprise magnetic elements and said channel-shaped recesses contain magnetic elements, said magnetic elements being positioned in said ring parts so that the opposite poles of each magnetic element attract each other.
8. A demonstration finger ring having changeable parts as claimed in claim 1 wherein said setting part comprises a base, a setting mounted on said base and layer surrounding said setting.
9. A demonstration finger ring having changeable parts as claimed in claim 1 wherein said male arcuate part has a portion of its outer surface substantially planar and said female arcuate part has a portion of its outer surface substantially planar.

References Cited
UNITED STATES PATENTS

| | | | |
|---|---|---|---|
| 899,296 | 9/1908 | Elliot | 63—29 R |
| 1,943,999 | 1/1934 | Atkins | 35—53 X |
| 3,127,757 | 4/1964 | Weiss | 63—15.7 |
| 3,263,444 | 8/1966 | Croce | 63—15.7 |

HARLAND S. SKOGQUIST, Primary Examiner

U.S. Cl. X.R.

63—15.7